United States Patent
Hara

(10) Patent No.: US 8,363,241 B2
(45) Date of Patent: Jan. 29, 2013

(54) APPARATUS, METHOD, AND COMPUTER-PROGRAM PRODUCT FOR PROCESSING IMAGE

(75) Inventor: Takayuki Hara, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 854 days.

(21) Appl. No.: 12/003,894

(22) Filed: Jan. 3, 2008

(65) Prior Publication Data

US 2008/0180752 A1 Jul. 31, 2008

(30) Foreign Application Priority Data

Jan. 31, 2007 (JP) ................. 2007-022107

(51) Int. Cl.
*G06K 15/00* (2006.01)

(52) U.S. Cl. ........ 358/1.14; 358/1.1; 358/1.9; 358/3.28; 358/522; 382/100

(58) Field of Classification Search .............. 358/3.28, 358/1.14; 382/100
See application file for complete search history.

(56) References Cited

U.S. PATENT DOCUMENTS

| 6,836,340 B2* | 12/2004 | Yoshihara et al. ........... 358/1.15 |
| 6,930,803 B1* | 8/2005 | Suzuki ........................ 358/471 |
| 6,935,565 B2* | 8/2005 | Nimura et al. ............... 235/468 |
| 6,993,148 B1* | 1/2006 | Miyashita et al. ........... 382/100 |
| 7,314,167 B1* | 1/2008 | Kiliccote ..................... 235/380 |
| 7,336,799 B2* | 2/2008 | Matsumura et al. ......... 382/100 |
| 2002/0163667 A1* | 11/2002 | Noda .......................... 358/1.15 |
| 2003/0210803 A1* | 11/2003 | Kaneda et al. ............... 382/100 |
| 2005/0171914 A1* | 8/2005 | Saitoh ........................... 705/51 |
| 2005/0264851 A1 | 12/2005 | Hara |
| 2006/0028689 A1* | 2/2006 | Perry et al. .................. 358/3.28 |
| 2006/0147084 A1 | 7/2006 | Hara |
| 2006/0164693 A1 | 7/2006 | Matsumoto et al. |
| 2007/0035774 A1* | 2/2007 | Kubo .......................... 358/3.28 |
| 2007/0091376 A1* | 4/2007 | Calhoon et al. ............ 358/3.28 |
| 2007/0110273 A1 | 5/2007 | Hara |

FOREIGN PATENT DOCUMENTS

| JP | 2003-209676 | 7/2003 |
| JP | 2005-102264 | 4/2005 |
| JP | 2005-182442 | 7/2005 |
| JP | 2006-050551 | 2/2006 |

* cited by examiner

*Primary Examiner* — Richard Zhu

(74) *Attorney, Agent, or Firm* — Harness, Dickey & Pierce, P.L.C.

(57) ABSTRACT

An image acquiring unit acquires an image. A storage unit stores therein the image acquired by the image acquiring unit. An information embedding unit embeds first information in the image acquired by the image acquiring unit. An information extracting unit extracts second information from the image stored in the storage unit. An information registering unit registers the first information in association with second information extracted from an image in which the first information is embedded.

8 Claims, 8 Drawing Sheets

INFORMATION DATABASE 134

| EMBEDDED INFORMATION | EXTRACTED INFORMATION |
|---|---|
| Date: 2006/1/21 13:21 | File: \\pc1\home\doc1.txt |
| Date: 2006/2/15 09:43 | File: \\pc2\temp\doc2.txt |
| Date: 2006/2/19 17:37 | Date: 2006/2/15 09:43 |
| ⋮ | ⋮ |

FIG. 6

| ID | ORIGINAL ID | COPY INFORMATION |
|---|---|---|
| 000 | — | USER A, 2006/1/21 13:21 |
| 001 | — | USER B, 2006/2/15 09:43 |
| 002 | 000 | USER C, 2006/2/19 17:37 |
| 003 | 001 | USER A, 2006/2/22 10:52 |
| 004 | 002 | USER B, 2006/2/26 11:55 |
| ⋮ | ⋮ | ⋮ |

302

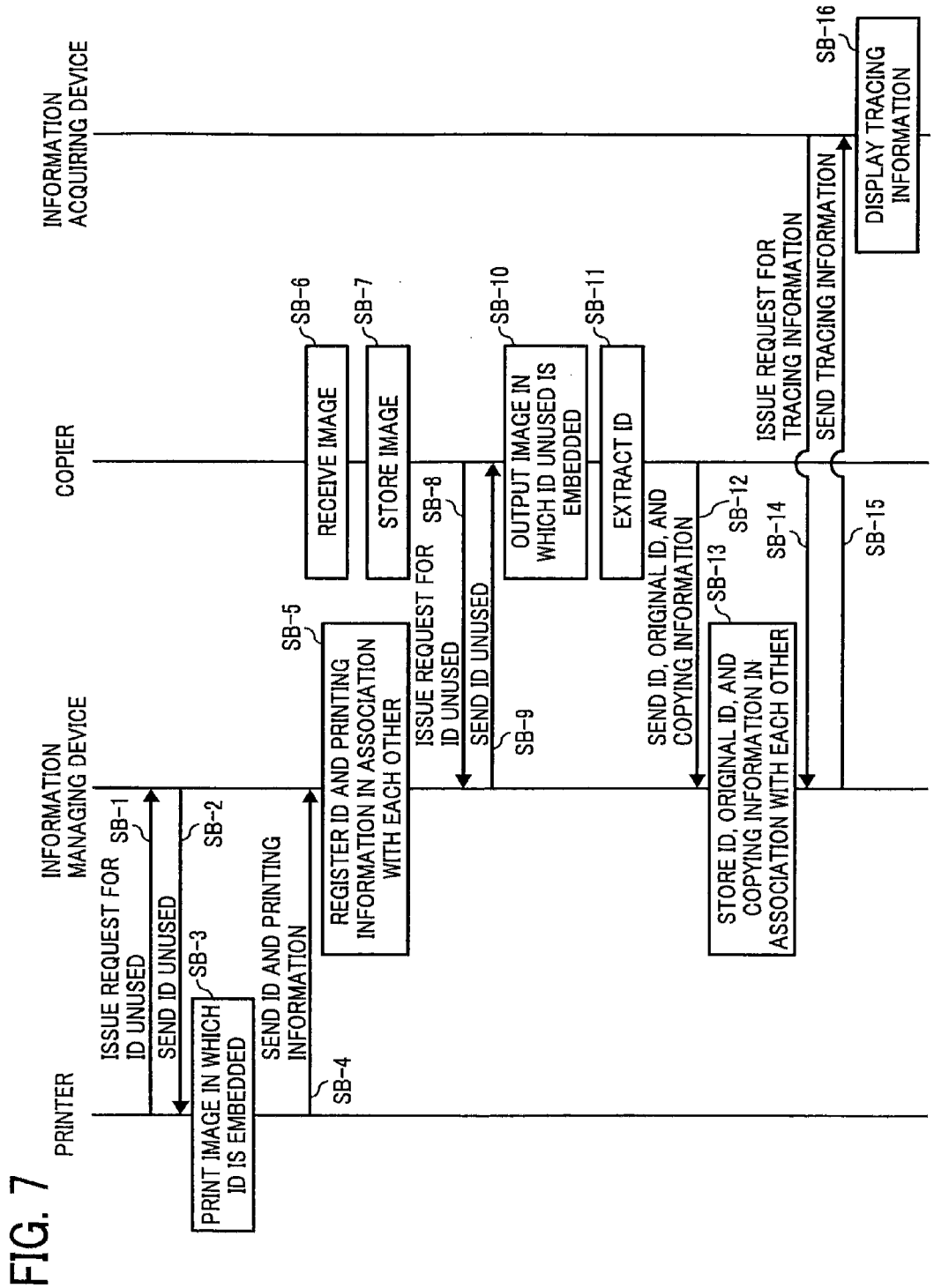

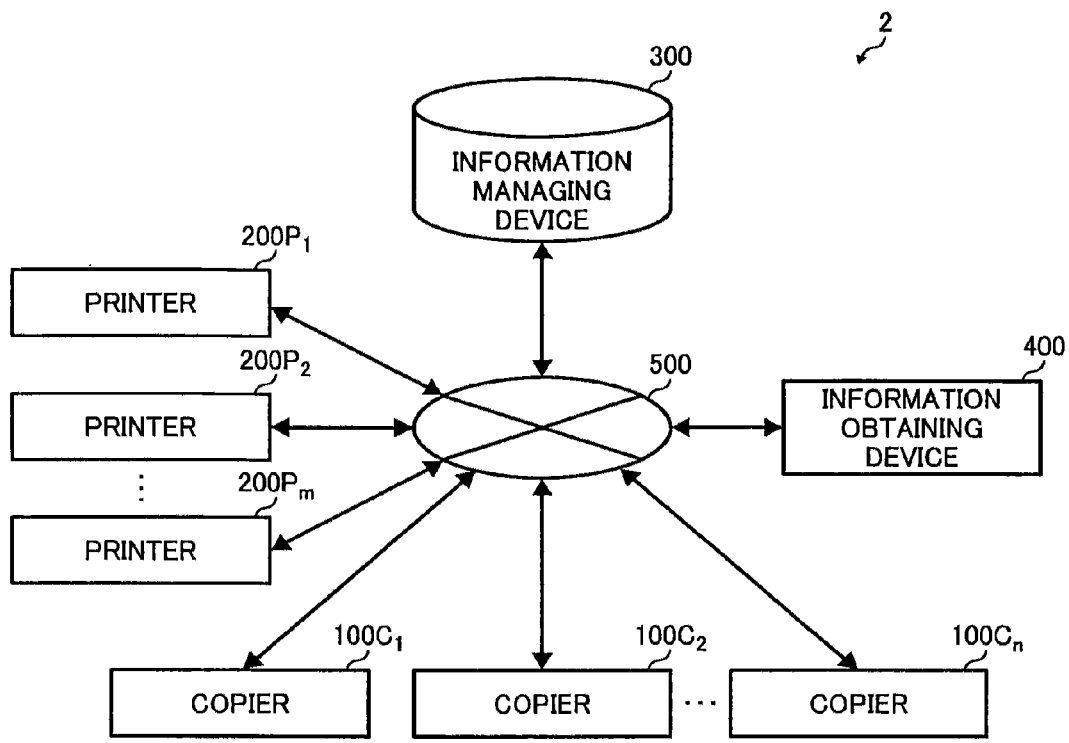

APPARATUS, METHOD, AND COMPUTER-PROGRAM PRODUCT FOR PROCESSING IMAGE

CROSS-REFERENCE TO RELATED APPLICATIONS

The present application claims priority to and incorporates by reference the entire contents of Japanese priority document 2007-022107 filed in Japan on Jan. 31, 2007.

BACKGROUND OF THE INVENTION

1. Field of the Invention

The present invention relates to an apparatus, a method, and a computer program product for processing image, and more particularly, to an apparatus, a method, and a computer program product for embedding predetermined information in an image.

2. Description of the Related Art

Developments are in progress in technologies for embedding information in an image with, for example, a barcode technology, a digital watermark technology, or steganography for, for example, tracing, protecting copyrights, detecting falsification, or adding meta information. Such technologies are mainly divided into a fragile type and a resistance-type, and the two types are used for different purposes. With respect to the resistance type, a copy image acquired by copying an original image embedded with information (i.e., original image containing embedded information) can contain the embedded information.

A copy image (electronic image) acquired by electronically copying an original image containing embedded information can contain the embedded information. On the other hand, a print image acquired by printing the electronic image on a paper recording medium loses embedded information in many cases, because image degradation tends to occur on a paper recording medium. To prevent this problem, technologies for embedding information resistant to copying and printing are disclosed in Japanese Patent Application Laid-open No. 2003-209676, Japanese Patent Application Laid-open No. 2005-102264, Japanese Patent Application Laid-open No. 2005-182442, and Japanese Patent Application Laid-open No. 2006-050551.

However, even if the technologies for embedding information resistant to printing and copying are employed, image degradation tends to occur in a copy image acquired by copying an image containing embedded information and copied on a paper recording medium. This increases the possibility of loosing the embedded information.

Because image degradation tends to occur with the technology for embedding information having high resistance generally, a technology for embedding information having low resistance is useful to keep its image quality in printing an image.

To solve the above problem, a method of newly embedding information in an original image previously containing embedding information has been developed.

With this method, however, a time consuming process is required for extracting the information embedded in the original image before newly embedding information.

SUMMARY OF THE INVENTION

It is an object of the present invention to at least partially solve the problems in the conventional technology.

According to an aspect of the present invention, there is provided an apparatus for processing an image, which includes an image acquiring unit that acquires an image; a storage unit that stores therein the image acquired by the image acquiring unit; an information embedding unit that embeds first information in the image acquired by the image acquiring unit; an information extracting unit that extracts second information from the image stored in the storage unit; and an information registering unit that registers the first information in association with second information extracted from an image in which the first information is embedded.

Furthermore, according to another aspect of the present invention, there is provided a method of processing an image, which includes acquiring an image; storing the image acquired at the acquiring; embedding first information in the image acquired at the acquiring; extracting second information from the image stored at the storing; and registering the first information in association with second information extracted from an image in which the first information is embedded.

Moreover, according to still another aspect of the present invention, there is provided a computer program product comprising a computer-usable medium having computer-readable program codes embodied in the medium that when executed cause a computer to execute acquiring an image; storing the image acquired at the acquiring; embedding first information in the image acquired at the acquiring; extracting second information from the image stored at the storing; and registering the first information in association with second information extracted from an image in which the first information is embedded.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a table of an example of contents of an information-related DB according to the second embodiment;

FIG. 7 is a sequence chart of a tracing-information acquiring process;

FIG. 8 is a schematic diagram of a configuration of an image forming system according to a third embodiment of the present invention;

FIG. 9 is a table of an example of contents of an information-related DB according to the third embodiment.

DETAILED DESCRIPTION OF THE PREFERRED EMBODIMENTS

Exemplary embodiments of the present invention are explained in detail below with reference to the accompanying drawings.

Figure 1:
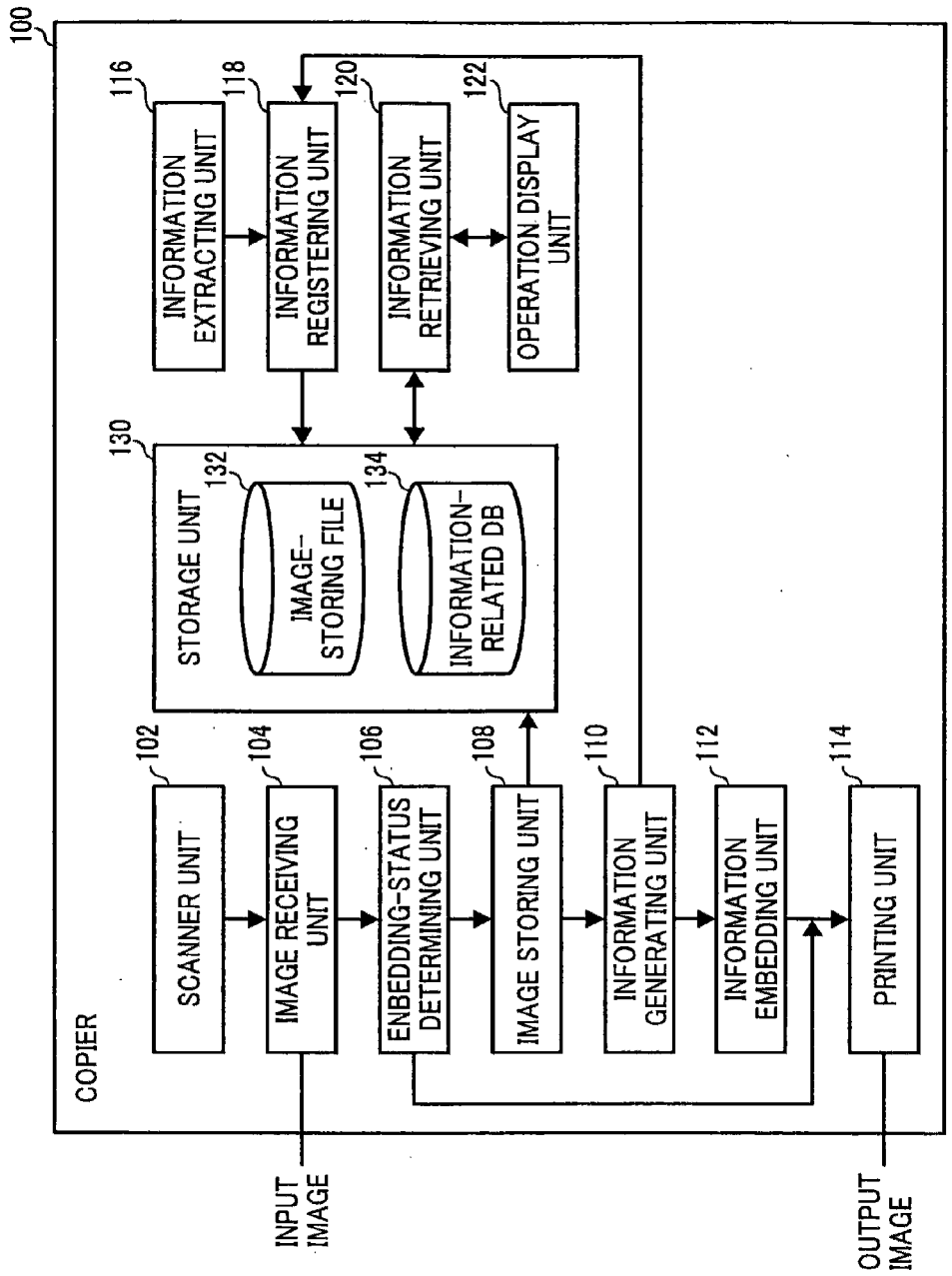
FIG. 1 is a schematic diagram of an image forming apparatus according to a first embodiment of the present invention.

FIG. 1 is a schematic diagram of a copier 100 as an example of an image forming apparatus according to a first embodiment of the present invention. The copier 100 includes a scanner unit 102, an image acquiring unit 104, an embedding-status determining unit 106, an image storing unit 108, an information generating unit 110, an information embedding unit 112, a printing unit 114, an information extracting unit 116, an information registering unit 118, an information retrieving unit 120, a operation display unit 122, and a storage unit 130.

The scanner unit 102 reads an image on an original by applying a light to the image on the original that moves in the sub-scanning direction, and converting the light reflected from the original into electricity with a photoelectric transducer such as a charge-coupled device (CCD). If the copier 100 includes an automatic document feeder (ADF), a plurality of pages of an original can be set thereon for printing. The ADF feeds all pages one by one to the scanner unit 102, and the scanner unit 102 reads them page by page as analog image data. The analog image data is temporarily stored as digital image data in a storage medium such as a buffer memory.

The image acquiring unit 104 acquires the image data from the scanner unit 102. The image acquiring unit 104 can also acquire image data sent from an external device.

The embedding-status determining unit 106 performs a determining process, i.e., selects one part of the image data (image) acquired by the image acquiring unit 104, and determines whether information is embedded in the image (i.e., the image contains embedded information) based on variation in a luminance histogram of the part of the image.

Information can be embedded in an image with, for example, a barcode technology, a digital watermark technology, or steganography for, for example, tracing, protecting copyrights, detecting falsification, or adding meta information.

Specifically, based on the luminance histogram of the image, the embedding-status determining unit 106 calculates a frequency of a near-white region of the image and a frequency of a region of the image having a luminance slightly lower than the white region. When the ratio of the calculated frequencies satisfies a predetermined condition, for example, when the frequency of the former region is equal to or less than a half of that of the latter region, the embedding-status determining unit 106 determines that the image contains embedded information. This method shortens the time required for the determining process. In addition, because the determination is made based on one part of the image, the time required for the determining process can be further shortened.

The image storing unit 108 stores the image in an image-storing file 132 of the storage unit 130 when the embedding-status determining unit 106 determines that the image contains embedded information.

The information generating unit 110 performs an information generating process, i.e., generates information to be embedded in the image acquired by the image acquiring unit 104. The information generating unit 110 generates as embedded information, for example, a printing history (user name, date of print, printer identification information (ID)) and information for identifying an image depending on purposes. The first embodiment explains the case, as an example, where the information generating unit 110 generates information on printing performed by the printing unit 114, specifically, a copying date (Date: 200X/Y/Z 00:00).

The information embedding unit 112 performs an information embedding process, i.e., embeds the information generated by the information generating unit 110 in the image.

The printing unit 114 performs a printing process, i.e., prints the image in which the information is embedded by the information embedding unit 112 on a recording medium based on print settings to output the image.

The information extracting unit 116 performs an information extracting process, i.e., extracts the information embedded in the image stored in the image-storing file 132. The information extracting unit 116 extracts the information in a manner corresponding to the information embedding process performed by the information embedding unit 112. In the following, the embedded information extracted by the information extracting unit is sometimes simply referred to as "extracted information".

The information registering unit 118 performs a registering process, i.e., registers, in an information-related database (DB) 134, the information embedded by the information embedding unit 112 and the information extracted by the information extracting unit 116 in association with each other.

The information retrieving unit 120 refers the information-related DB 134 to acquire the information embedded in the original image upon receipt of a request for the information from a user via the operation display unit 122. The first embodiment explains information embedded in an original image to be copied as, for example, information on where a file is stored (HYPERLINK "File:\\\\pc1\\home\\doc1.txt" File:\\pc1\home\doc1.txt).

The operation display unit 122 includes a key operation unit and a touch-panel display unit, and serves as a user interface via which a user can specify settings or parameters and issues an operation instruction. The operation display unit 122 displays necessary information on the touch-panel display unit and receives input of settings.

The storage unit 130 stores therein various types of computer programs for controlling each unit of the copier 100, and various types of data and files. The storage unit 130 includes, for example, a random access memory (RAM), a read only memory (ROM), a hard disk drive (HDD), an optical disk, a flexible disk (FD), and a nonvolatile memory.

The storage unit 130 includes the image-storing file 132 and the information-related DB 134. If the embedding-status determining unit 106 determines that the image acquired by the image acquiring unit 104 contains the embedded information, the image storing unit 108 stores the image in the image-storing file 132. In addition, The information registering unit 118 registers, in the information-related DB 134, the information generated by the information generating unit 110 and the information extracted by the information extracting unit 116 in association with each other.

The information embedding process performed by the information embedding unit 112 is explained in detail with reference to FIG. 2. In the information embedding process, two minute dot pattern is added to the background of an image.

Figure 2:
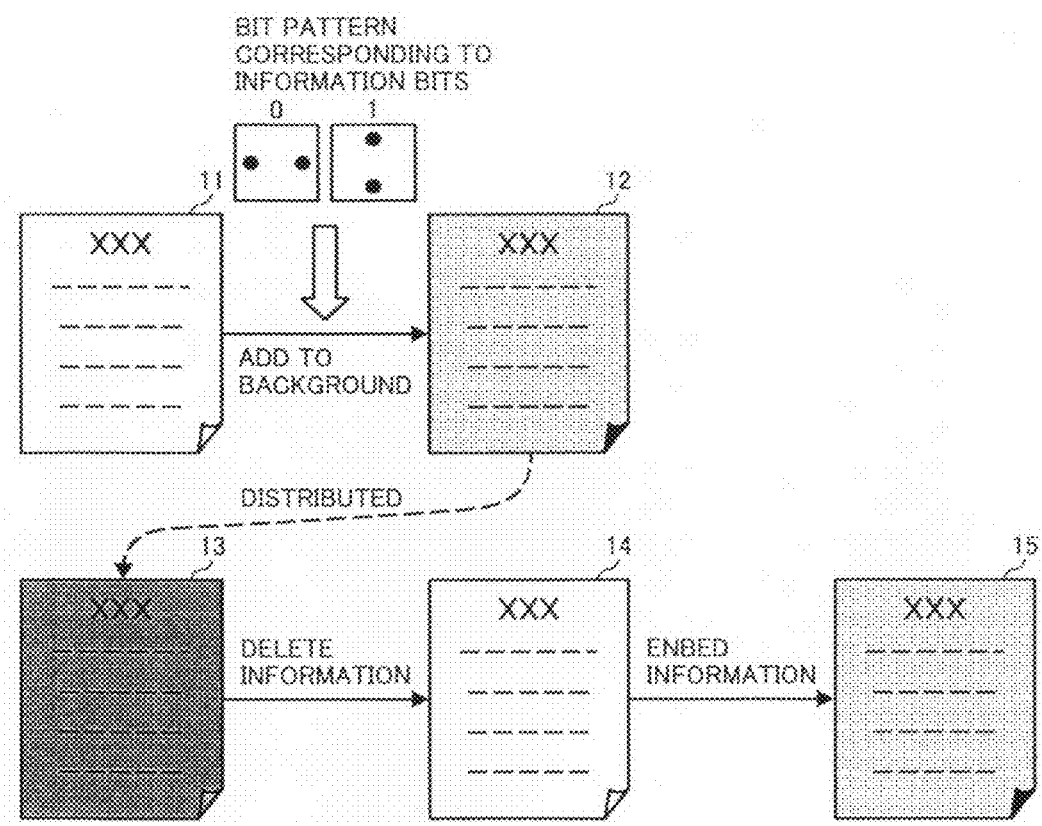
FIG. 2 is a schematic diagram for explaining an information embedding process performed by an information embedding unit shown in FIG. 1.

As shown in FIG. 2, first, a dot pattern corresponding to information bits is added to a background of an image 11 to acquire an image 12. The image 12 is distributed such that the copier 100 can be shared, and is scanned by the scanner unit 102 as an image 13 to be embedded with information. When the size of the dots used for embedding information is substantially small with respect to scanning resolution, the background of the image 13 embedded with information is observed as gray. By converting pixels having a luminance of a predetermined value or higher into white pixels, the embedded information is deleted, so that an image 14 is acquired. The information embedding unit 112 newly adds a dot pattern to the image 14 to acquire an image 15 having embedded information. As explained above, according to the first embodiment, information can be embedded in an image with a conventional method.

The information embedding process performed by the information embedding unit 112 is explained above as that information generated by the information generating unit 110 is embedded in an image in which information is originally embedded. However, the information embedding unit 12 can embed information in an image to be printed differently. In other words, information can be embedded by overwriting information originally embedded, or information can be embedded after information previously embedded is deleted.

For example, a method of embedding information with respect to a Fourier coefficient can be employed. Specifically, a Fourier coefficient of an image acquired by the image acquiring unit 104 is acquired, and the Fourier coefficient is controlled for embedding information. Alternatively, a method of embedding information in a pixel space can be employed.

Figure 3:
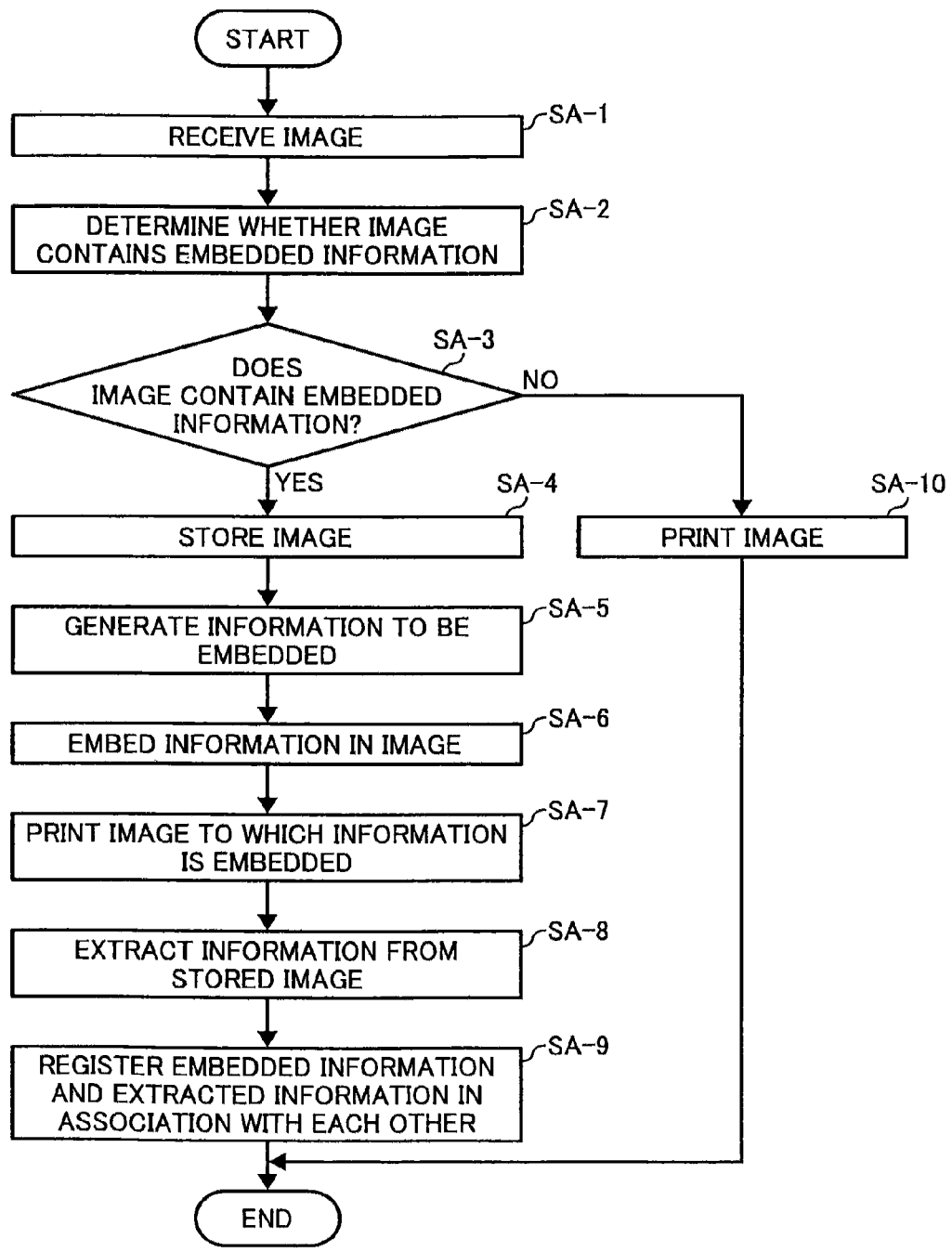
FIG. 3 is a flowchart of an information registering process performed in the image forming apparatus shown in FIG. 1.

FIG. 3 is a flowchart of a process performed by the copier 100 for registering information to be embedded and extracted information in association with each other.

The image acquiring unit 104 acquires image data read by the scanner unit 102 (Step SA-1).

The embedding-status determining unit 106 determines whether the image acquired at Step SA-1 contains embedded information (Step SA-2). Specifically, the embedding-status determining unit 106 selects a portion of the image and determines whether the image contains embedded information based on variation in a luminance histogram of the portion of the image.

When the embedding-status determining unit 106 determines that the image contains embedded information (YES at Step SA-3), the image storing unit 108 stores the image in the image-storing file 132 (Step SA-4). On the other hand, when the embedding-status determining unit 106 determines that the image contains no embedded information (NO at Step SA-3), the printing unit 114 prints the image (Step SA-10).

After the image storing unit 108 stores the image in the image-storing file 132 at Step SA-4, the information generating unit 110 generates information to be embedded in the image (Step SA-5). At Step SA-5, the information generating unit 110 generates information on printing, specifically, on copying date "Date: 2/19/2006 17:37".

The information embedding unit 112 embeds the information "Date: 2/19/2006 17:37" in the image (Step SA-6). Specifically, the information embedded in the image is deleted by changing pixels having a luminance of a predetermined value or higher into white pixels, and then, a dot pattern is newly added to the image, so that the image newly contains embedded information.

The printing unit 114 prints the image newly embedded with information at Step SA-6 onto a recording medium (Step SA-7).

Thereafter, the information extracting unit 116 extracts the embedded information from the image stored in the image-storing file 132 at Step SA-4 in a manner corresponding to how the information embedding unit 112 embeds the information at Step SA-6 (Step SA-8). The information extracted at Step SA-8 is "Date: 2/15/2006 09:43".

The information registering unit 118 registers, in the information-related DB 134, the information embedded in the image at Step SA-6, i.e., "Date: 2/19/2006 17:37", and the information extracted at Step SA-8, i.e., "Date: 2/15/2006 09:43" in an associated manner (Step SA-9).

Figures 4, 5:
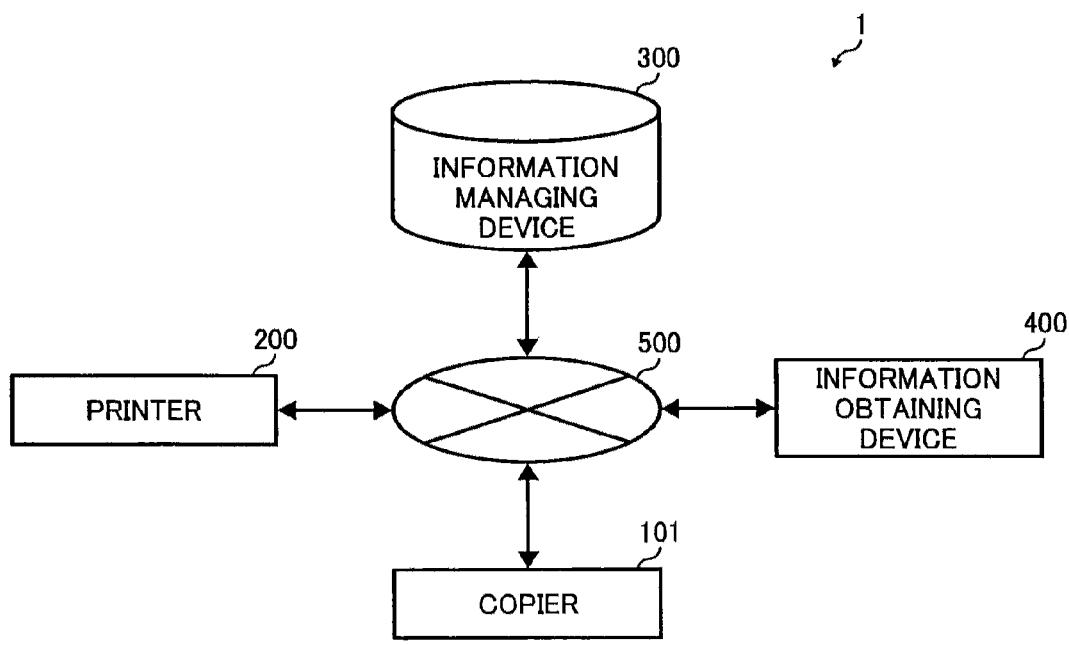
FIG. 4 is an example of contents of an information-related DB shown in FIG. 1.
FIG. 5 is a schematic diagram of a configuration of an image forming system according to a second embodiment of the present invention.

With the process at Step SA-9, the embedded information "Date: 2/19/2006 17:37" and the extracted information "Date: 2/15/2006 09:43" is stored in the in the information-related DB 134 as shown in FIG. 4.

The information retrieving unit 120 refers to the information-related DB 134 and retrieves information on where a file that is embedded in the original image is stored. Specifically, when embedded information extracted from the image is "Date: 2/19/2006 17:37", the information retrieving unit 120 searches the information-related DB 134 for "Date: 2/19/2006 17:37". When there is a hit, the information retrieving unit 120 retrieves "Date: 2/15/2006 09:43" as extracted information that corresponds to "Date: 2/19/2006 17:37". Because the extracted information (i.e., "Date: 2/15/2006 09:43") does not represent where the file is stored, the information retrieving unit 120 further searches the information-related DB 134 for "Date: 2/15/2006 09:43". When there is a hit, the information retrieving unit 120 retrieves, "HYPERLINK "File: \\\\pc2\\temp\\doc2.txt" File:\\pc2\temp\doc2.txt" as extracted information that corresponds to "Date: 2/15/2006 09:43". Thus, the information retrieving unit 120 can identify the information "HYPERLINK "File: \\\\pc2\\temp\\doc2.txt" File:\\pc2\temp\doc2.txt" embedded in the original image.

As described above, according to the first embodiment, the information generating unit 110 generates information to be embedded in an image acquired by the image acquiring unit 140, and the information embedding unit 112 embeds the information in the image. Meanwhile, the image acquired by the image acquiring unit 104 is stored in the image-storing file 132 and the information embedded in the image stored in the image-storing file 132 is extracted as extracted information. The extracted information and the information embedded by the information embedding unit 112 are stored in association with each other in the information-related DB 134. Therefore, the time required for embedding new information in an image can be shortened. In other words, the time from scanning an image to printing the image can be shortened.

The information embedding unit 112 overwrites the information previously embedded in the image acquired by the image acquiring unit 104 and embeds the information generated by the information generating unit 110. Alternatively, after the information previously embedded in the image is deleted, the information embedding unit 112 embeds the information generated by the information generating unit 110. Therefore, the time required for embedding new information in an image, employing a conventional information embedding method, can be shortened.

When a user issues a request for information on where a file embedded in a desired original image is stored, the information retrieving unit 120 searches the information-related DB 134 for the information (file) embedded in the desired original image. When there is a hit, the information retrieving unit 120 retrieves information corresponding to the information. Therefore, it is possible to acquire the information on where the file is stored and recognize the history of copying the image.

Moreover, according to the first embodiment, the embedding-status determining unit 106 determines whether the image acquired by the image acquiring unit 104 contains embedded information. When the embedding-status determining unit 106 determines that the image contains no embedded information, the image can be printed on a paper recording medium by the printing unit 114 while not required a process for generating information to be embedded in the image and a process for embedding the information generated in the image.

The embedding-status determining unit 106 determines whether information is originally embedded in the image based on variation in a luminance histogram of a part of the image. Specifically, the embedding-status determining unit 106 receives the luminance histogram of the part of the image, and the embedding-status determining unit 106 measures a luminance of a near-white region (white region) of the image and a luminance of a region of the image, which is lower than that of the white region. Based on the ratio of the luminances, the embedding-status determining unit 106 determines whether the information is originally embedded in the image. With this, the time required for the determining process can be shortened.

Because the embedding-status determining unit 106 determines whether information is originally embedded based on one part of the image, the time required for the determining process can be further shortened.

When a plurality of images are input into the copier 100 and the scanner unit 102 reads the data on the images, the information extracting process and the registering process on an image are performed after the information generating process, the information embedding process, and the printing process for other images are performed. If a plurality of central processing units (CPU) is employed, the information extracting process and the information registering process can be performed in parallel with the information generating process, the information embedding process, and the printing process. With this, the computational resources can be efficiently used, which shortens the time required for copying a plurality of images.

The information extracting process and the registering process can be performed while the CPU is idle, for example, during a specific time such as night. Therefore, the copier 100 can be prevented from being used by other users.

The image forming apparatus according to the embodiment of the present invention can be applied to a system including a plurality of devices (for example, a host computer, an interface device, a scanner, and a printer) or one device such as a host computer.

A computer program can be executed on a computer to realize the same functions as those of the image forming apparatus. Such computer program can be provided as being stored in a recording medium to be executed by the computer (a CPU, a micro processing unit (MPU), a digital signal processor (DSP), etc.). Examples of the recording medium include an optical recording medium such as a flexible disk (FD), a hard disk (HD), an optical disk, an optical magnetic disk, a compact disk-read only memory (CD-ROM), a magnetic tape, a non-volatile memory, and a read only memory (ROM), a magnetic recording medium, an optical magnetic recording medium, or a semiconductor recording medium.

By executing the program read by the computer, for example, an operating system (OS) on the computer can execute part or the entire processes performed by the image forming apparatus according to the computer program.

The computer program can be loaded from the recording medium into a memory of an expansion board inserted into the computer or an expansion unit connected to the computer. A CPU or the like of the expansion board or the expansion unit reads the computer program from its memory and executes it to implement part or the entire processes performed by the image forming apparatus.

FIG. 5 is a schematic diagram of an example of an image forming system 1 according to a second embodiment of the present invention. The image information system 1 includes a copier 101, a printer 200, an information managing device 300, and an information acquiring device 400. The copier 101 has the same configuration and operates in the same manner as the copier 100, and the same explanation is not repeated. The printer 200 embeds information in a document (image) to be printed and prints the document on a paper recording medium. The information managing device 300 registers embedded information sent from the copier 101 and embedded information sent from the printer 200 in association with each other and manages the embedded information. The information acquiring device 400 issues a request for information on the history of copying an image by the printer 200, and receives the information.

The copier 101, the printer 200, the information managing device 300, and the information acquiring device 400 are connected via a network 500, and thus, can communicate with each other. Alternatively, the printer 200, the copier 101, and the information acquiring device 400 can be directly connected to the information managing device 300.

The printer 200 issues a request for identification information (ID) for identifying an image to be printed to the information managing device 300 and receives the ID from the information managing device 300. After embedding the ID in the image as embedded information, the printer 200 prints the image on a paper recording medium. The printer 200 sends the embedded information (ID) and information on the printing (printing information) to the information managing device 300 via the network 500. The printing information includes a user name and a date of print (User X, 200X/Y/Z 00:00).

The printer 200 performs the information embedding process as the copier 100 does, and the same description is not repeated.

The copier 101 copies the image having been printed on the sheet recording medium by the printer 200. Specifically, after reading the image to be copied, the copier 101 issues a request for identifying information (ID) for identifying the image to the information managing device 300 and receives the ID from the information managing device 300. The copier 101 embeds the ID in the image and copies the image. While performing the printing process, the copier 101 stores the image having been read and extracts, as an original ID, the ID embedded in the image from the stored image. The copier 101 sends, to the information managing device 300, the ID embedded in the image, the original ID extracted from the stored image, and printing information in association with each other. The printing information includes a user name and a date of print (User X, 200X/Y/Z 00:00).

The information managing device 300 registers various types of information sent from the printer 200 and the copier 101 in an information-related DB 302 shown in FIG. 6, and manages the information in the information-related DB 302.

The information acquiring device 400 sends information (original ID) extracted from a scanned image to the information managing device 300 and issues a request for information on the history of copying the image (tracing information).

A process for acquiring the tracing information (tracing-information acquiring process) is explained in detail below with reference to FIG. 7. FIG. 7 is a sequence chart of the tracing-information acquiring process.

When a user issues a request for printing an image to the printer 200, the printer 200 issues, to the information managing device 300, a request for an ID that is not registered in the information-related DB 302 and that can be used as an ID of the image to be printed by the printer 200 (Step SB-1).

Upon receiving the request for the ID, which is issued by the printer 200, the information managing device 300 searches the information-related DB 302 and determines an unused ID (i.e., an ID that is not registered in the information-related DB 302). For example, the information managing device 300 sends the ID "000" to the printer 200 (Step SB-2).

The printer 200 embeds the ID in the image to be printed and prints the image on a paper recording medium (Step SB-3). Thereafter, the printer 200 sends the embedded information (ID "000") and printing information to the information managing device 300 (Step SB-4). In this case, a user name and a date of print "User A, 1/21/2006 13:21" are sent as the printing information.

The information managing device 300 registers, in the information-related DB 302, the ID "000" (embedded information) and the printing information "User A, 1/21/2006 13:21", which are sent from the printer 200, in association with each other (Step SB-5). The printing information is registered as copy information.

After Step SB-5, the sheet recording medium on which the image containing the embedded information (ID "000") is printed at Step SB-3 is distributed to the copier 101 such that the copier 101 can be shared, and is scanned by the copier 101.

The copier 101 acquires the image scanned (Step SB-6), and stores the image (Step SB-7). The copier 101 issues, to the information managing device 300, a request for an ID that is not registered in the information-related DB 302 and that can be used as an ID of the image to be copied by the copier 101 (Step SB-8).

Upon receiving the request for the ID, which is issued by the copier 101, the information managing device 300 searches the information-related DB 302 and determines an ID not registered in the information-related DB 302. For example, the information managing device 300 sends an ID "002" to the copier 101 (Step SB-9).

The copier 101 embeds the information (ID "002"), which is sent from the information managing device 300, in the image to be copied and prints the image on a paper recording medium (Step SB-10) as a copy image. Thereafter, the copier 101 extracts the information (ID "000") embedded in the image (Step SB-11). Thereafter, the copier 101 sends, to the information managing device 300, the ID "002" embedded in the image by the copier 101, and the ID "000" that is originally embedded in the image, and copying information (Step SB-12). The copier 101 sends a user name and a date of print ("User C, 2/19/2006 17:37") as the copying information.

The information managing device 300 registers, in the information-related DB 302, the embedded information the ID "002" and the ID "002" and the copying information "User C, 2/19/2006 17:37" as copy information (Step SB-13). In this case, the ID "002" originally embedded in the image is registered as an original ID.

The information-related DB 302 shown in FIG. 6 is acquired by performing the process explained above for a plurality of times.

The information acquiring device 400 sends information (for example, the ID "002") embedded in a scanned image to the information managing device 300, and issues a request for tracing information on the image (Step SB-14).

Upon receiving the request from the information acquiring device 400, the information managing device 300 searches the information-related DB 302 for the tracing information, extracts the tracing information, and sends the tracing information to the information acquiring device 400 (Step SB-15).

By searching the information-related DB 302 for the information (ID "002") and based on a hit of the ID "002", the information managing device 300 can retrieve the copy information "User C, 2/19/2006 17:37" corresponding to the ID "002". Because the information (original ID "000") corresponding to the ID "002" is also stored in the information-related DB 302, the information managing device 300 can further retrieve the copy information "User A, 1/21/2006 13:21" that corresponds to the ID "000" by searching the information-related DB 302 for the ID "000".

In the above manner, the information managing device 300 can extract "User A, 1/21/2006 13:21" and "User C, 2/19/2006 17:37" as tracing information.

The information acquiring device 400 displays the tracing information sent from the information managing device 300 (Step SB-16) so that the user can know the copying history (user name and copying date) of the image printed on the paper recording medium and how many times the image has been copied.

As explained above, according to the second embodiment, the information managing device 300 registers the information (ID) embedded in the image to be printed by the printer 200 and the printing information in association with each other, and registers the information (ID) embedded in the image to be copied by the copier 101, the extracted information (original ID), and the copying information in association with each other. The information acquiring device 400 sends the information (ID) embedded in the scanned image and issues the request for the tracing information to the information managing device 300. Upon receiving the request from the information acquiring device 400, the information managing device 300 searches the information-related DB 302 for the ID. The information managing device 300 retrieves the copy information based on the hit of the ID, and sends the copy information as the tracing information. The information acquiring device 400 displays the tracing information. Accordingly, the user can know the copying history of the image printed on the paper recording medium and how many times the image has been copied.

An image forming system 2 according to a third embodiment of the present invention is explained below with reference to FIG. 8.

FIG. 8 is a schematic diagram of a configuration of the image forming system 2. The image forming system 2 includes a plurality of printers $200P_1$ to $200P_n$, a plurality of copiers $100C_1$ to $100C_n$, the information managing device 300, and the information acquiring device 400.

The printer 200 according to the second embodiment sends a user name and a date of print (User X, 200X/Y/Z 00:00) as printing information to the information managing device 300. On the other hand, the printers $200P_1$ to $200P_n$ according to the third embodiment each sends printing information including identification information for identifying a printer (for example, "$P_1$") to the information managing device 300.

While the copier 100 according to the second embodiment sends a user name and a date of print (User X, 200X/Y/Z) as copying information, each of the copiers $100C_1$ to $100C_n$ sends copying information including identification information for identifying a copier (for example, "$C_1$") to the information managing device 300.

According to the third embodiment, the information managing device 300 registers, as copy information, the printing information that includes the identification information for identifying a printer and copying information including the identifying information for identifying a copier in the information-related DB 302 shown in FIG. 9. The information managing device 300 extracts tracing information in the same manner as in the case of the second embodiment, and the same explanation is not repeated.

Figure 10:
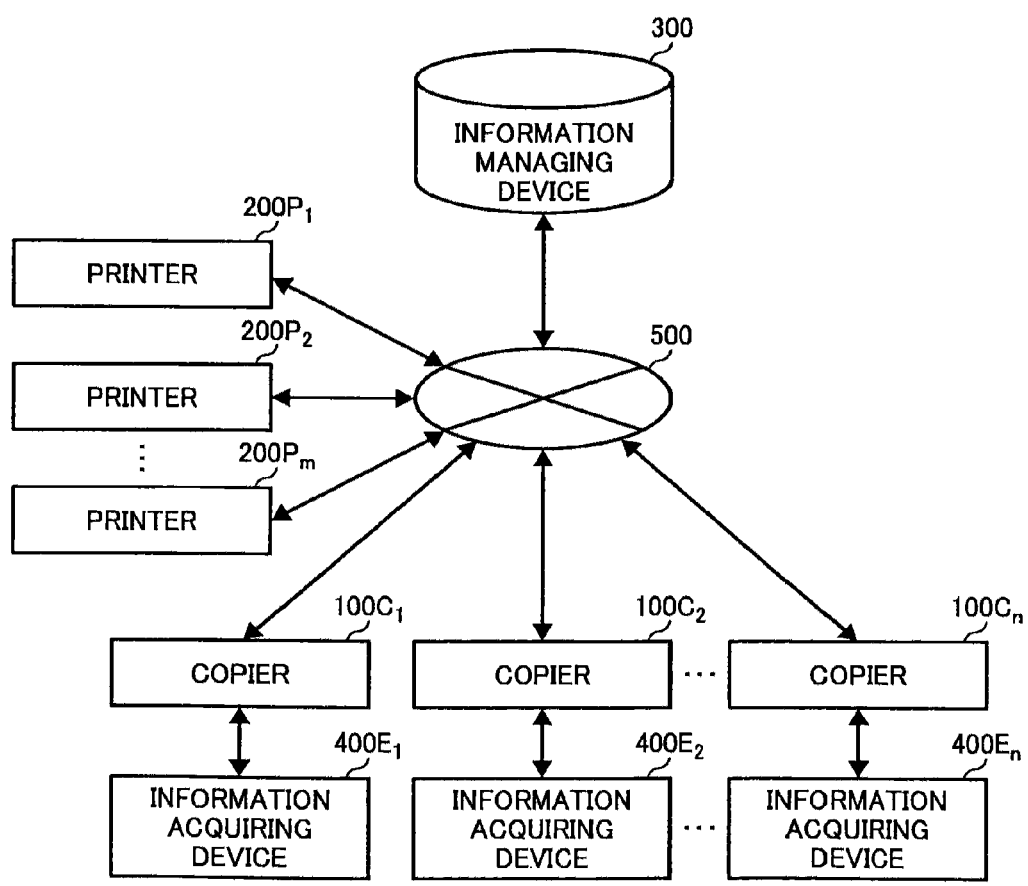
FIG. 10 is a schematic diagram of an example of a configuration of the image information system according to the third embodiment.

As shown in FIG. 8, according to the third embodiment, the information acquiring device 400 is connected with other devices via the network 500 in the image forming system 2. Alternatively, as shown in FIG. 10, the copiers $100C_1$ to $100C_n$ can be respectively connected to information acquiring devices $400E_1$ to $400E_n$.

According to the third embodiment, the information managing device 300 registers information (ID) embedded in an image to be printed by a printer and the printing information including the identification information for identifying the printer in association with each other, and registers information (ID) embedded in an image to be copied by a copier, extracted information (original ID), and the copying information including the identification information for identifying the printer in association with each other. The information acquiring device 400 sends information (ID) embedded in a scanned image and issues a request for tracing information to the information managing device 300. Upon receiving the request from the information acquiring device 400, the information managing device 300 searches the information-related DB 302 for the ID sent from the information acquiring device 400. The information managing device 300 retrieves the copy information based on the hit of the ID, and sends the copy information as tracing information. The information acquiring device 400 displays the tracing information. Accordingly, the user can know the copying history of an image printed on a paper recording medium and how many times the image has been copied. Accordingly, the user can know which printer or copier has printed or copied an image printed on the paper recording medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for processing an image, the apparatus comprising:
   an image acquiring unit to acquire an image;
   a determining unit to determine whether the image acquired by the image acquiring unit includes first information previously embedded therein;
   a storage unit to store therein the image acquired by the image acquiring unit when the determining unit determines that the image includes the first information;
   an information generating unit to generate second information to be newly embedded in the image acquired by the image acquiring unit;
   an information embedding unit to embed, after the storage unit stores therein the image, the second information generated by the generating unit in the image acquired by the image acquiring unit, by overwriting the first information or deleting the first information;
   a printing unit to print the image in which the second information is embedded;
   an information extracting unit to extract, from the image stored in the storage unit, the first information that is previously embedded in the image;
   an information registering unit to register, in a database, the first information that is previously embedded in the image in association with the second information that is newly embedded in the image; and
   an information retrieving unit to, upon receipt of a request from a user asking for the first information previously embedded in the image, refer to and search the database for the second information newly embedded in the image so as to retrieve the previously embedded first information corresponding to the newly embedded second information,
   wherein the determining unit is configured to extract a part of the image acquired by the image acquiring unit, and is further configured to calculate a frequency of a near-white region of the image and a frequency of a region of the image having luminance lower than the white region and determine that the image acquired by the image acquiring unit includes the first information previously embedded therein when a ratio of the calculated frequencies satisfies a predetermined condition.

2. The apparatus according to claim 1, wherein, when the determining unit determines that the image acquired by the image acquiring unit does not include the first information previously embedded therein, the printing unit prints the image acquired by the image acquiring unit.

3. The apparatus according to claim 1, wherein the second information generated by the information generating unit is information indicating at least one of user name, date of print, identification information of a printing apparatus, print setting, and identification information of an image to be printed.

4. A method of processing an image, the method comprising:
   acquiring an image via an image acquiring unit;
   determining, via a determining unit, whether the image acquired by the image acquiring unit includes first information previously embedded therein;
   storing the image acquired at the acquiring in a storage unit when the determining unit determines that the image includes the first information;
   generating second information, via an information generating unit, to be newly embedded in the image acquired by the image acquiring unit;
   embedding via an information embedding unit, after the storage unit stores therein the image, the second information generated by the generating unit in the image acquired by the image acquiring unit by overwriting the first information or deleting the first information;
   printing, via a printing unit, the image in which the second information is embedded via a printing unit;
   extracting, from the image stored in the storage unit, the first information that is previously embedded in the image via an information extracting unit
   registering, in a database, the first information that is previously embedded in the image in association with the second information that is newly embedded in the image via an information registering unit; and
   upon receiving a request from a user asking for the first information previously embedded in the image, refer to and search the database for the second information newly embedded in the image so as to retrieve the previously embedded first information corresponding to the newly embedded second information via an information retrieving unit, wherein
   the determining includes extracting a part of the image acquired by the image acquiring unit, and calculating a frequency of a near-white region of the image and a frequency of a region of the image having luminance lower than the white region and determining that the image acquired by the image acquiring unit includes the first information previously embedded therein when a ratio of the calculated frequencies satisfies a predetermined condition.

5. The method according to claim 4, wherein the second information is information indicating at least one of user name, date of print, identification information of a printing apparatus, print setting, and identification information of an image to be printed.

6. The method according to claim 4, wherein
the extracting includes extracting the first information from the image stored at the storing while an image processing apparatus in which the image forming method is used is inactive, and
the registering includes registering the first information in association with the second information while the image processing apparatus is inactive.

7. The method according to claim 4, further comprising:
acquiring the first information and the second information registered at the registering.

8. A computer program product comprising a non-transitory computer-usable medium having computer-readable program codes embodied in the medium that when executed cause a computer to execute:
acquiring an image via an image acquiring unit;
determining, via a determining unit, whether the image acquired by the image acquiring unit includes first information previously embedded therein;
storing the image acquired at the acquiring in a storage unit when the determining unit determines that the image includes the first information;
generating second information, via an information generating unit, to be newly embedded in the image acquired by the image acquiring unit;
embedding via an information embedding unit, after the storage unit stores therein the image, the second information generated by the generating unit in the image acquired by the image acquiring unit by overwriting the first information or deleting the first information;
printing, via a printing unit, the image in which the second information is embedded via a printing Unit;
extracting, from the image stored in the storage unit, the first information that is previously embedded in the image via an information extracting;
registering, in a database, the first information that is previously embedded in the image in association with the second information that is newly embedded in the image via an information registering unit; and
upon receiving a request from a user asking for the first information previously embedded in the image, refer to and search the database for the second information newly embedded in the image so as to retrieve the previously embedded first information corresponding to the newly embedded second information via an information retrieving unit, wherein
the determining includes extracting a part of the image acquired by the image acquiring unit, and calculating a frequency of a near-white region of the image and a frequency of a region of the image having luminance lower than the white region and determining that the image acquired by the image acquiring unit includes the first information previously embedded therein when a ratio of the calculated frequencies satisfies a predetermined condition.

* * * * *

UNITED STATES PATENT AND TRADEMARK OFFICE
CERTIFICATE OF CORRECTION

| | | |
|---|---|---|
| PATENT NO. | : 8,363,241 B2 | Page 1 of 1 |
| APPLICATION NO. | : 12/003894 | |
| DATED | : January 29, 2013 | |
| INVENTOR(S) | : Takayuki Hara | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this
Eighteenth Day of November, 2014

Michelle K. Lee
*Deputy Director of the United States Patent and Trademark Office*